US007602485B2

(12) United States Patent
Mori

(10) Patent No.: US 7,602,485 B2
(45) Date of Patent: Oct. 13, 2009

(54) OPTICAL WINDOW CONTAMINATION DETECTING DEVICE FOR OPTICAL APPARATUS

(75) Inventor: Toshihiro Mori, Takatsuki (JP)

(73) Assignee: Hokuyo Automatic Co., Ltd., Osaka (JP)

( * ) Notice: Subject to any disclaimer, the term of this patent is extended or adjusted under 35 U.S.C. 154(b) by 0 days.

(21) Appl. No.: 12/003,376

(22) Filed: Dec. 21, 2007

(65) Prior Publication Data

US 2008/0158555 A1    Jul. 3, 2008

(30) Foreign Application Priority Data

Dec. 28, 2006  (JP)  ............... 2006-355154

(51) Int. Cl.
*G01N 21/00*  (2006.01)
(52) U.S. Cl. .................. 356/239.2; 356/4.01
(58) Field of Classification Search ... 356/239.2–239.8, 356/237.1–237.6, 4.01, 5.01
See application file for complete search history.

(56) References Cited

U.S. PATENT DOCUMENTS

| 5,455,669 | A | 10/1995 | Wetteborn |
| 6,153,878 | A | 11/2000 | Jakob et al. |
| 6,940,554 | B2 | 9/2005 | Robins et al. |
| 7,135,672 | B2 * | 11/2006 | Land ............... 250/221 |
| 2003/0193604 | A1 | 10/2003 | Robins et al. |

FOREIGN PATENT DOCUMENTS

| DE | 19706612 A1 | 8/1998 |
| DE | 19732776 A1 | 11/1999 |
| EP | 897 121 A2 | 2/1999 |
| EP | 903 572 A2 | 3/1999 |
| EP | 1 562 055 A2 | 10/2005 |
| JP | 58-2638 A | 1/1983 |
| JP | 10-90412 A | 4/1998 |
| JP | 10-090412 | 10/1998 |
| JP | 2000-019014 A | 1/2000 |
| JP | 2001-103347 A | 4/2001 |
| JP | 2002-196075 A | 7/2002 |
| JP | 2004-230315 A | 8/2004 |

OTHER PUBLICATIONS

Notification of Reasons for Refusal dated Nov. 19, 2007.
European Search Report issued in EP 07124119.4, Dec. 30, 2008, 7 pages.

* cited by examiner

*Primary Examiner*—Gregory J Toatley, Jr.
*Assistant Examiner*—Tri T Ton
(74) *Attorney, Agent, or Firm*—Pillsbury Winthrop Shaw Pittman, LLP

(57) ABSTRACT

An optical window contamination detecting device capable of detecting even microscopic contamination on an optical window with a limited number of contamination detecting sensors. The optical window contamination detecting device is used for a scanning type distance measuring apparatus that includes a casing, formed with an optical window, which accommodates a light transmitting unit, a scanning mechanism for deflection scanning measurement light output from the light transmitting unit into a measuring space through the optical window, and a light receiving unit for detecting reflected light from an object through the optical window. The optical window contamination detecting device includes a plurality of reflection photoelectric sensors arranged along the optical window on an outer side of the optical window and a retro-reflective member attached to the scanning mechanism, the retro-reflective member for reflecting detection light from the reflection photoelectric sensor having passed through the optical window towards the reflection photoelectric sensor.

6 Claims, 10 Drawing Sheets

OPTICAL WINDOW CONTAMINATION DETECTING DEVICE FOR OPTICAL APPARATUS

This application is based on an application No. 2006-355154 filed in Japan, the contents of which are hereby incorporated by reference.

BACKGROUND OF THE INVENTION

1. Field of the Invention

The present invention relates to an optical window contamination detecting device for an optical apparatus such as an imaging apparatus for deflection scanning light with a mirror, irradiating with the light a measuring space outside the apparatus to acquire a one-dimensional image from an intensity of reflected light from an object, and a light wave distance measuring apparatus for measuring a distance based on delay time between modulated measurement light and reflected light from an object.

2. Description of the Related Art

As shown in FIG. 8, there is proposed a scanning type distance measuring apparatus 100 accommodating, in a casing 101 formed with an optical window 102, a light transmitting unit 3, a scanning mechanism 4 for deflection scanning measurement light output from the light transmitting unit 3 into a measuring space through the optical window 102, and a light receiving unit 5 for detecting reflected light from an object X through the optical window 102.

The above-described distance measuring apparatus is used in a visual sensor of a robot or an automatic guided vehicle, an opening/closing sensor of a door, a monitoring sensor for detecting presence of an intruder to a monitoring region, a safety sensor for detecting a person or an object approaching a dangerous machine to safely stop the machine, and the like.

Furthermore, the distance measuring apparatus may also be used to recognize a shape of a vehicle or a human, and for example, may be used as a sensor for discriminating a vehicle type and counting the number of passing cars in the ETC system, or a monitoring sensor for counting the number of people and detecting flow of the people.

However, when the optical window 102 becomes contaminated with mud, water droplets, or the like, there arises a serious problem that the distance measuring function cannot be appropriately exhibited, such as an appropriate amount of light is not irradiated, and the light reflected by the object X is not detected.

Therefore, it is required a function of constantly monitoring even microscopic contamination instantaneously attached to the optical window arranged in a wide range in correspondence to a scanning range of the measurement light, and outputting an abnormality signal or a failure signal if the contamination significantly affects performance of the apparatus to safely stop the apparatus.

As a contamination detecting device of an optical window, a laser distance measuring device is proposed in U.S. Pat. No. 5,455,669 in which an optical window 41 is arranged in a curved form in an outer peripheral direction of the device so as to be inclined from a vertical direction, and a plural sets of light transmitting/receiving elements each including a light transmitting element 91 arranged on a lower side and a light receiving element 92 arranged on a upper side of the optical window 41, the sets of light transmitting/receiving elements for detecting contamination on the optical window 41 existing along optical paths 98, are arranged side by side along the optical window 41, as shown in FIG. 10A.

Japanese Laid-Open Patent Publication No. 10-90412 proposes an object information detection device for irradiating light with a light transmitting element 25 from an inner side of an optical window 2 and detecting with a light receiving element 29 the light double refracted by one part of the optical window 2 to detect contamination on the optical window 2, as shown in FIG. 10B.

However, in the technique described in the U.S. Pat. No. 5,455,669, there arise new problems such as adjustment of an optical axis of each light transmitting/receiving element and prevention of interference between the light transmitting/receiving elements arranged side by side, since a great number of light transmitting/receiving elements must be arranged side by side at small intervals to detect the entire region of the optical window without any blind spots when it is necessary to detect minor contamination. Furthermore, the number of components increases and thus the device becomes expensive.

In the technique described in Japanese Laid-Open Patent Publication No. 10-90412, the device can be configured more compact than that described in Patent Publication No. 5,455,669, but has a problem in that, when water droplets attach to a reflecting surface of a case, judgment is sometimes mistakenly made if the light is reflected diffusely by the water droplets and detected by the measurement light receiving element, and also has another problem in that a great number of light transmitting/receiving elements are required similarly to the above-described case when it is necessary to detect minor contamination on the optical window.

SUMMARY OF THE INVENTION

In view of the above problems, it is an object of the present invention to provide an optical window contamination detecting device for an optical apparatus, the device capable of detecting even minor contamination on an optical window with a limited number of contamination detecting sensors.

The present invention relates to an optical window contamination detecting device for a scanning type distance measuring apparatus including a casing formed with an optical window, the casing accommodating a light transmitting unit, a scanning mechanism for deflection scanning measurement light output from the light transmitting unit into a measuring space through the optical window, and a light receiving unit for detecting reflected light from an object through the optical window; the optical window contamination detecting device including a plurality of reflection photoelectric sensors arranged along the optical window on an outer side of the optical window; and a retro-reflective member, attached to the scanning mechanism, the member for reflecting detection light from the reflection photoelectric sensor having passed through the optical window towards the reflection photoelectric sensor.

Furthermore, other inventions will become apparent with reference to the following examples.

DESCRIPTION OF THE PREFERRED EMBODIMENTS

The following is a description of an example in which an optical window contamination detecting device according to the present invention is applied to an optical window of a scanning type distance measuring apparatus.

Figure 8:
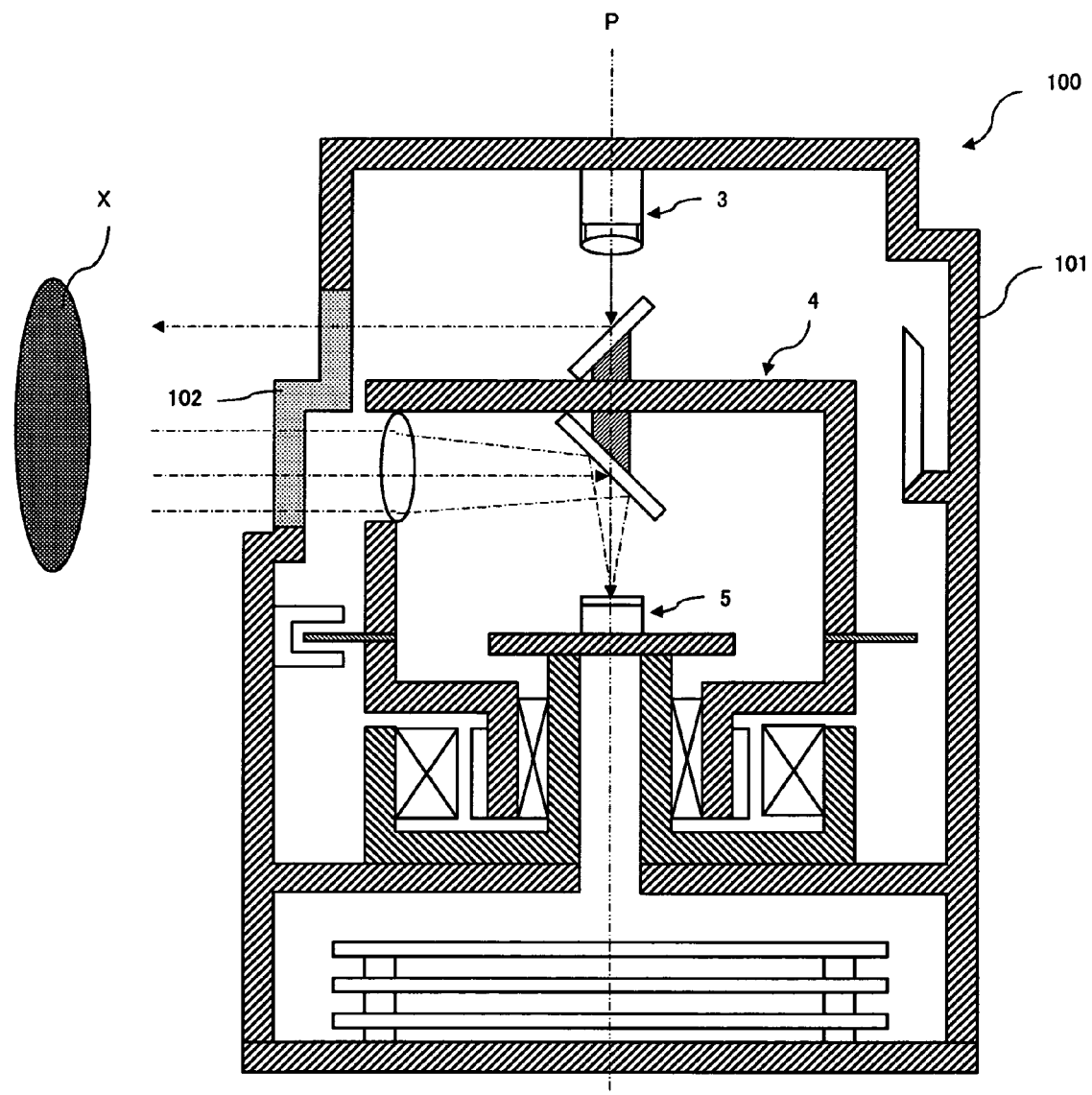
FIG. 8 is a schematic longitudinal cross sectional view showing an overall configuration of the scanning type distance measuring apparatus.

Generally, the distance measuring apparatus applies modulation to measurement light output from a laser light source LD, irradiates the light to an object X through an optical window 102, and measures a distance by detecting reflected light from the object X with a light receiving element PD through the optical window 102, as shown in FIG. 8, where two types of AM (Amplitude Modulation) method and a TOF (Time of Flight) method are put into practical use as methods for modulating the measurement light.

Figure 9A:
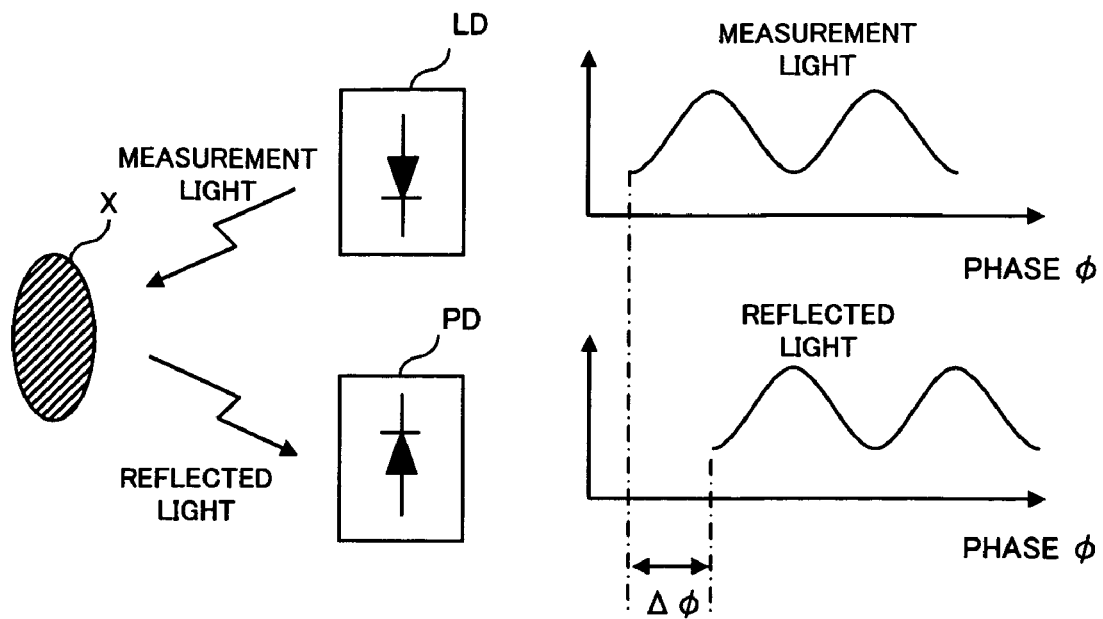
FIG. 9A is an explanatory view of the distance measurement principle adopting the AM method.
Figure 9B:
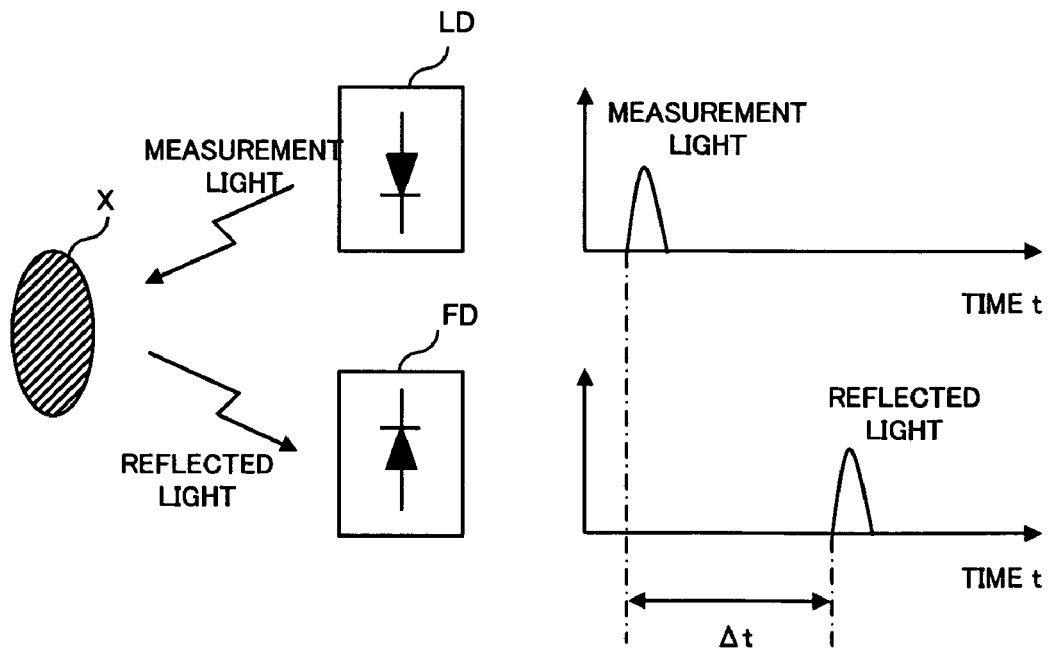
FIG. 9B is an explanatory view of the distance measurement principle adopting the TOF method.

The AM method is a method of photoelectrically converting measurement light AM modulated at a sine wave and reflected light thereof, calculating a phase difference $\Delta\phi$ between signals thereof, and computing a distance from the phase difference $\Delta\phi$, as shown in FIG. 9A and Equation 1, whereas the TOF method is a method of photoelectrically converting measurement light modulated in a pulse form and reflected light thereof, and computing a distance from delay time $\Delta t$ between signals thereof, as shown in FIG. 9B and Equation 2. Here, symbol L denotes a distance to an object, symbol C denotes a velocity of light, symbol f denotes a modulation frequency, symbol $\Delta\phi$ denotes a phase difference, and symbol $\Delta t$ denotes delay time.

$$L = \Delta\phi \cdot C/(4\pi \cdot f) \qquad \text{Equation 1}$$

$$L = \Delta t \cdot C/2 \qquad \text{Equation 2}$$

The scanning type distance measuring apparatus applied with the present invention can adopt either one of the above-described methods.

Figure 1:
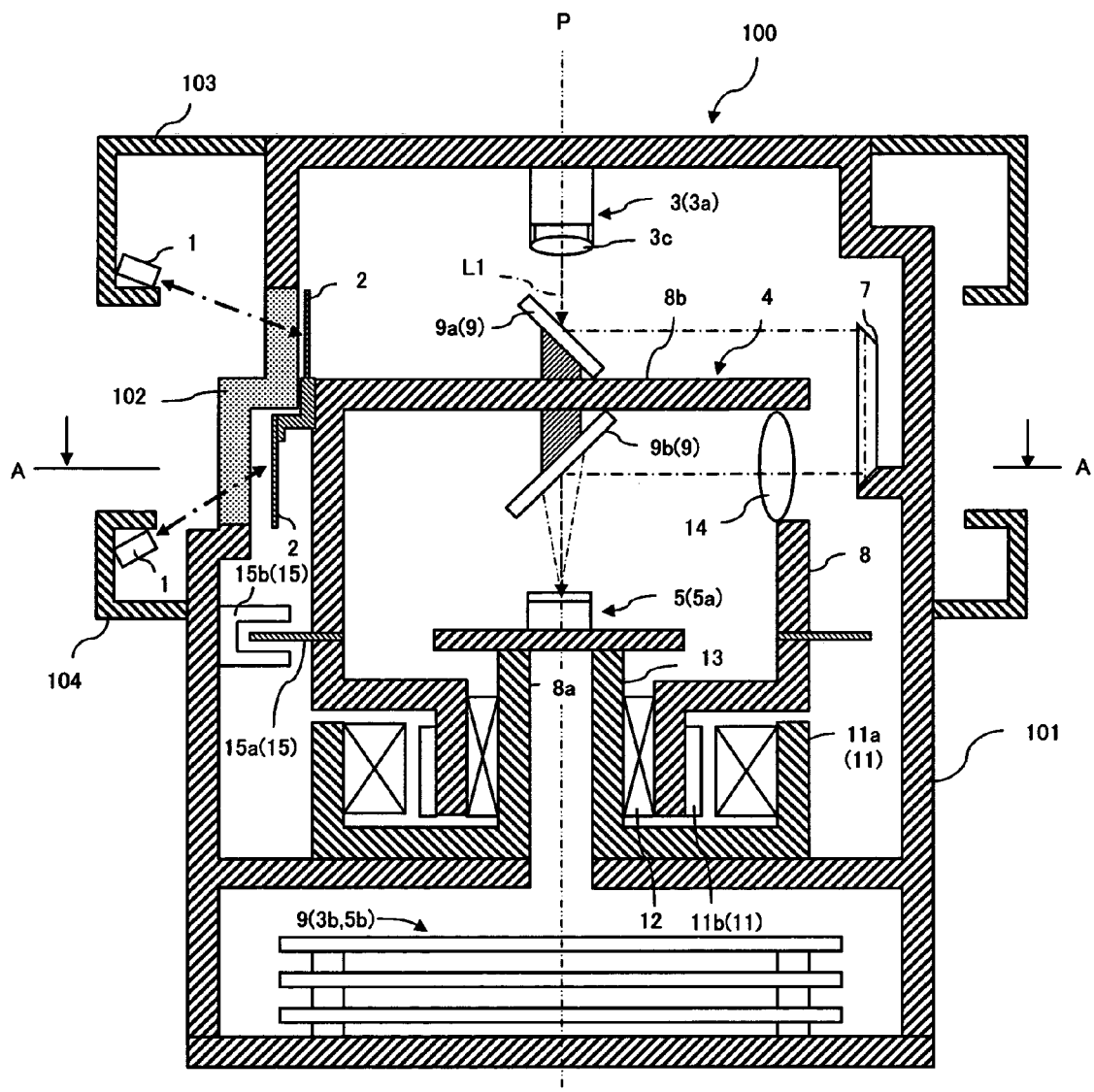
FIG. 1 is a schematic longitudinal cross sectional view showing an overall configuration of an optical window contamination detecting device for a scanning type distance measuring apparatus according to the present invention.
Figure 2:
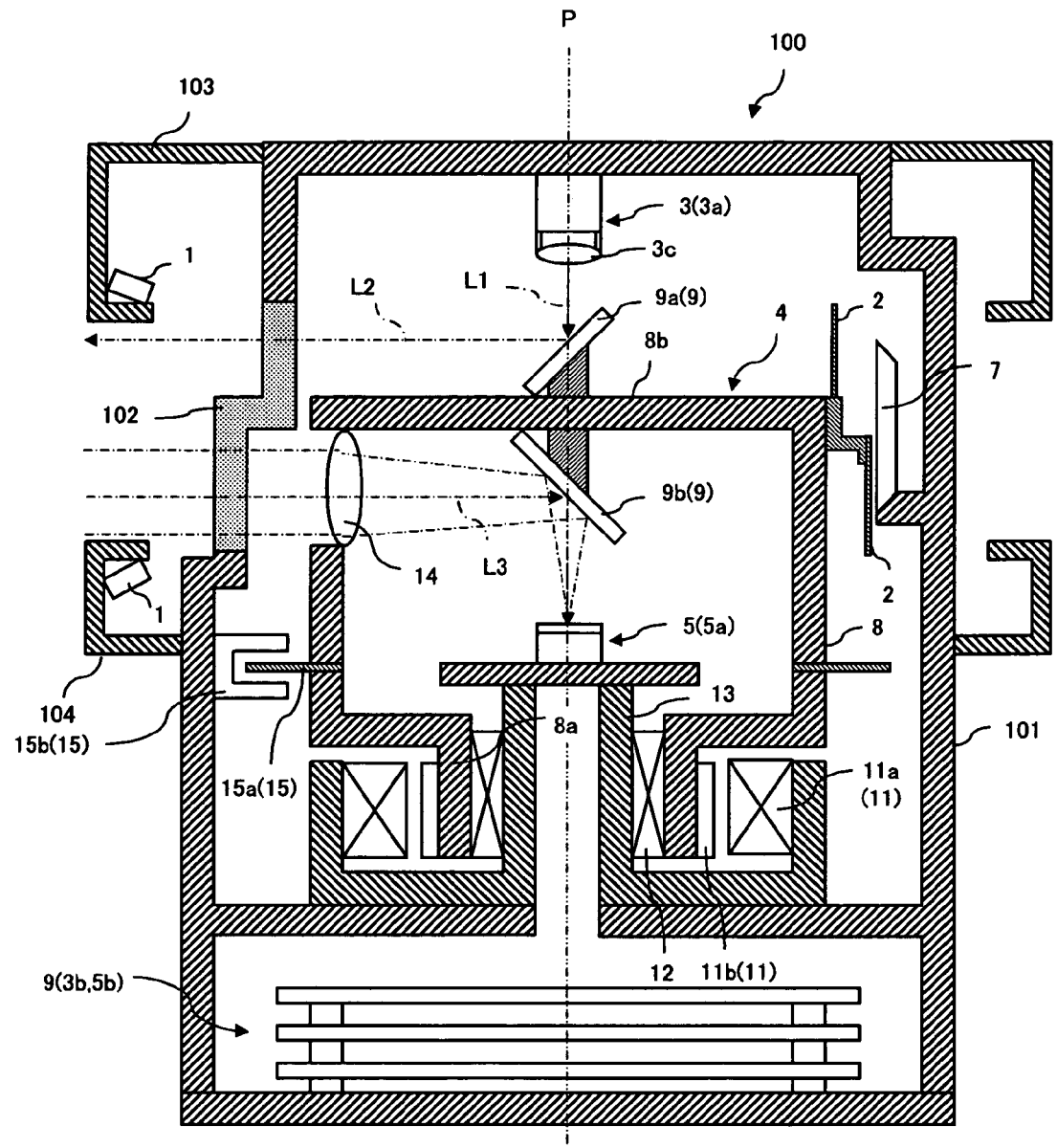
FIG. 2 is a schematic longitudinal cross sectional view showing an overall configuration of an optical window contamination detecting device for a scanning type distance measuring apparatus according to the present invention.

As shown in FIGS. 1 and 2, the scanning type distance measuring apparatus 100 has, in a substantially cylindrical casing 101 with an inner wall surface covered with a light absorbing member such as a blackout curtain for absorbing stray light, a light transmitting unit 3 for outputting measurement light, a light receiving unit 5 for detecting reflected light, the light transmitting unit 3 and the light receiving unit 5 being arranged so as to face with each other, and a scanning mechanism 4 for rotational scanning the measurement light, the scanning mechanism 4 being arranged between the light transmitting unit 3 and the light receiving unit 5.

The scanning mechanism 4 includes a rotating body 8 that rotates about a predetermined center of rotation axis P, a deflection mirror 9 that rotates integrally with the rotating body 8, and a motor 11 for rotary driving the rotating body 8. The rotating body 8 is configured by a cylindrical peripheral wall 8a having a lower end diameter being reduced, and a top plate 8b, and is rotatably supported by a hollow shaft 13 by way of a bearing 12 arranged on an inner peripheral surface thereof.

The deflection mirror 9 is configured by a first deflection mirror 9a arranged on an upper surface of the top plate 8b of the rotating body 8, and a second deflection mirror 9b arranged on a lower surface of the top plate 8b, where these deflection mirrors are respectively arranged with an angle of inclination of about 45 degrees with respect to the center of rotation axis P.

The motor 11 is configured by a rotor including a magnet 11b attached to an outer peripheral surface of the diameter reduced lower end of the peripheral wall 8a, and a stator including a coil 11a arranged on a casing side, where the rotating body 8 rotates about the center of rotation axis P through interaction of the coil 11a and the magnet 11b.

An encoder plate 15a including a plurality of optical slits is arranged in a peripheral direction on an outer peripheral surface of the rotating body 8, and a photo-interrupter 15b is arranged on a rotation path of the encoder plate 15a, where the encoder plate 15a and the photo-interrupter 15b configures a scanning angle detecting unit 15 for detecting a scanning angle of the rotating body 8.

The light transmitting unit 3 is configured by a light source formed with a light emitting element 3a utilizing a semiconductor laser, and a driving circuit 3b of the light emitting element 3a, where the light emitting element 3a is fixedly arranged on an upper side of the casing 101 so that an optical axis L1 of measurement light output therefrom and the center of rotation axis P coincide, and an optical lens 3c for making a beam diameter of light constant is arranged on the optical axis L1.

The light receiving unit 5 is fixedly arranged inside the rotating body 8 so as to face the light transmitting unit 3 with the scanning mechanism 4 in between on the center of rotation axis P, and is configured by a light receiving element 5a formed with an avalanche photodiode for detecting reflected light and an amplifier circuit 5b for amplifying a reflection signal photoelectrically converted by the light receiving element 5a.

The light transmissive optical window 102 having a constant width in a vertical direction is arranged on a peripheral wall of the casing 101 so that measurement light output from the light transmitting unit 3 is irradiated into a measuring space by the scanning mechanism 4 and reflected light reflected by the measuring object X located in the measuring space is detected by the light receiving unit 5.

The optical window 102 has a horizontal step so that measurement light is not double refracted by the optical window 102 to enter the light receiving unit 5 as stray light, where measurement light passes the step from an upper region thereof and reflected light passes the step from a lower region thereof, and the first deflection mirror 9a is arranged at a position corresponding to the upper side of the step and the second deflection mirror 9b is arranged at a position corresponding to the lower side of the step.

In other words, after the measurement light exit from the light transmitting unit 3 along the optical axis L1 is deflected in a direction of an optical axis L2 in a horizontal direction by the first deflection mirror 9a, the measurement light passes through the optical window 102 to be irradiated into the measuring space, and the reflected light from the measuring object that has passed through the optical window 102 along an optical axis L3 in the horizontal direction is deflected downward in the vertical direction by the second deflection mirror 9b to be guided to the light receiving unit 5, as shown in FIG. 2.

A light receiving lens 14 for converging the reflected light from the measuring object onto the light receiving unit 5 is arranged on the optical axis L3 along which the reflected light is guided to the light receiving unit 5.

At a bottom of the casing 101, there is arranged a signal processing substrate 9 for rotation controlling the scanning mechanism 4 and drive controlling the light emitting element 3a to calculate a distance to the measuring object based on the reflection signal detected by the light receiving unit 5.

In the signal processing substrate 9, a rotation angle of the scanning mechanism 4 is calculated based on a pulse signal input from the scanning angle detecting unit 15, so as to recognize a direction of the measuring object being positioned corresponding to the reflected light.

The optical window 102 is arranged so that the measurement light can be scanned in a range of about 180 degrees to 270 degrees with the center of rotation axis P as a center, and a prism serving as a light guiding member 7 for guiding reference light for correcting a distance calculated in the signal processing substrate 9 is arranged on the inner wall of the casing 101 opposing the optical window 102.

In other words, as shown in FIG. 1, each time the measurement light is scanned once by the scanning mechanism 4, a reference distance from the light transmitting unit 3 to the light receiving unit 5 within the distance measuring apparatus is calculated based on the reference light directly entering the light receiving unit 5 from the light transmitting unit 3 via the light guiding member 7, and a distance calculated based on the reflected light from the object in the measuring space is corrected based thereon.

Figure 3:
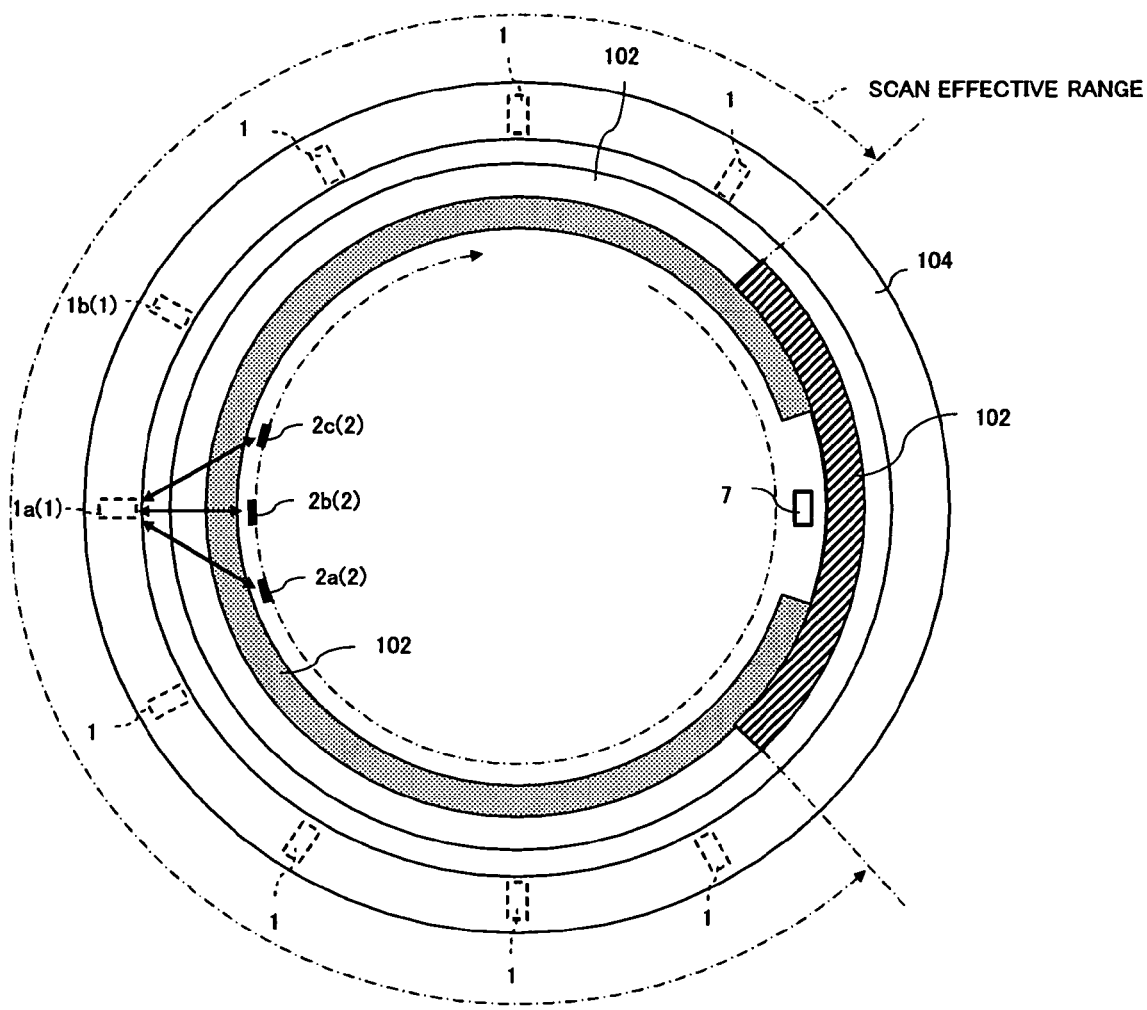
FIG. 3 is a cross sectional view of a main part taken along line A-A of FIG. 1.

As shown in FIGS. 1 to 3, housings 103, 104 are arranged in a bulge-out manner respectively upwards and downwards the casing 101 with the optical window 102 in between, a plurality of reflection photoelectric sensors 1 is provided to the housings 103, 104 in the circumferential direction of the casing 101, that is, along the optical window 102 on the outer side of the optical window 102, and a retro-reflective member 2 for reflecting the detection light from the reflection photoelectric sensor 1 having passed through the optical window 102 towards the reflection photoelectric sensor 1 is attached to the scanning mechanism 4.

The retro-reflective member 2 is arranged on extension of the optical axes L2, L3 of the measurement light and the reflected light on the side opposite to the reflecting surfaces of the first and second deflection mirrors 9a, 9b, that is, at a position not shielding light paths of the measurement light and the reflected light. The position of the retro-reflective member 2 being attached is not particularly limited as long as being arranged outside the light paths of the measurement light and the reflected light.

According to the above configuration, contamination on the optical window can be appropriately detected while measuring a distance without the light paths of the measurement light and the reflected light being inhibited by the retro-reflective member.

The reflection photoelectric sensor 1 accommodates in the casing a light emitting element for emitting detection light having a wavelength of an infrared region and a light receiving element for receiving light having a wavelength of the infrared region, where the detection light irradiated from the light emitting element towards the optical window 102 enters the retro-reflective member 2 through the optical window 102, the reflected light from the retro-reflective member 2 through the optical window 102 is detected by the light receiving element, and contamination and the like attached onto the optical window 102 is detected based on an amount of the detection light.

Figure 6A:
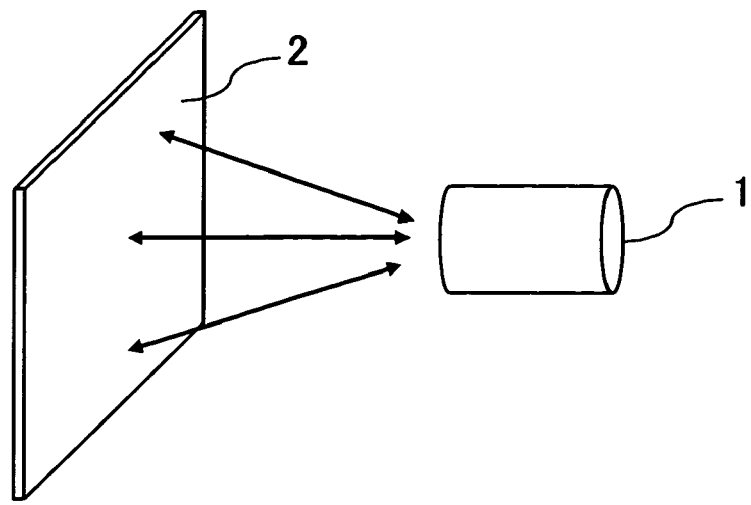
FIGS. 6A, 6B, and 6C are explanatory views of a retro-reflective member.
Figure 6B:
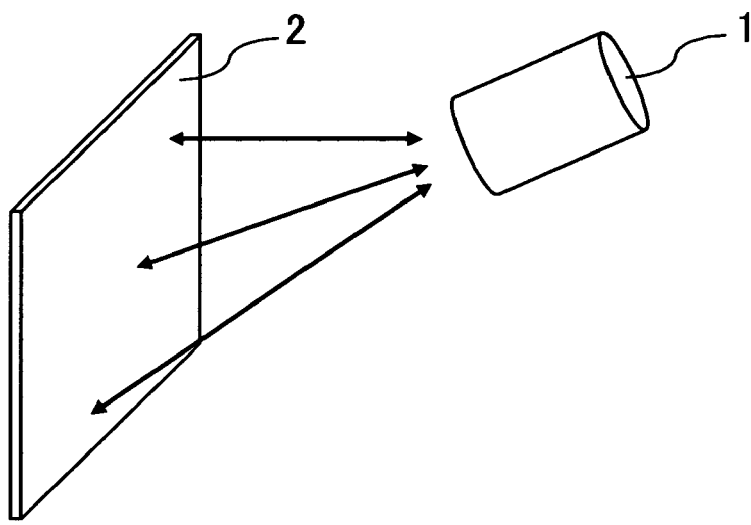
Figure 6C:
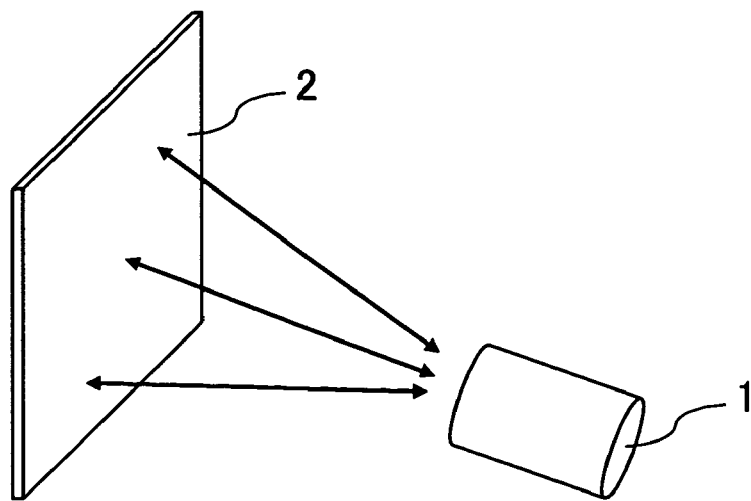

As shown in FIGS. 6A, 6B, and 6C, the retro-reflective member 2 is a reflection member that, when irradiated with light exit from the light emitting part of the reflection photoelectric sensor 1, returns the light towards the light source, where detection can be made even with a very small reflection plate since the light is reflected at almost 100% reflectivity in the light entering direction.

Even microscopic contamination on the optical window 102 can be detected based on the amount of reflected light being detected, with arrangement of the reflection photoelectric sensor 1 and the retro-reflective member 2 so that the region of the optical window 102 for passing the measurement light for distance measurement is positioned on the irradiation light path or the reflection light path.

In other words, when the detection light output from the fixedly arranged reflection photoelectric sensor is irradiated onto the retro-reflective member which moves along the optical window with the operation of the scanning mechanism, the light is retroreflected from the retro-reflective member towards the reflection photoelectric sensor, and thus the range of the optical window corresponding to the irradiating range of the output light from one reflection photoelectric sensor can be detected, and contamination on the entire range of the optical window can be detected with satisfactory precision even with a few number of reflection photoelectric sensors.

The signal processing circuit 90 formed in the signal processing substrate 9 will now be described in detail.

Figure 4:
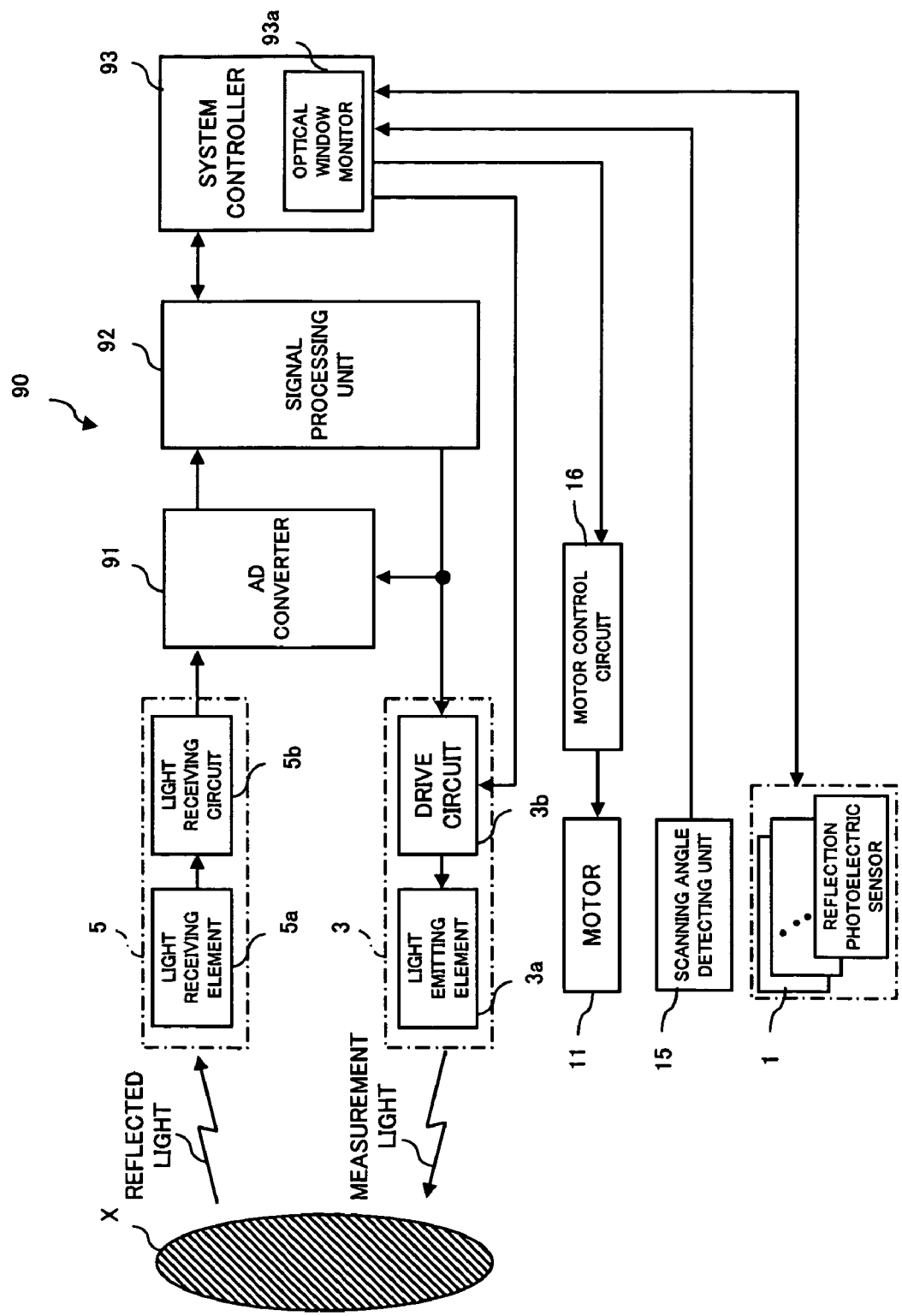
FIG. 4 is a block configuration view of a signal processing circuit.

As shown in FIG. 4, the signal processing circuit 90 includes a drive circuit 3b for AM modulating laser light output from the light emitting element 3a with a modulation signal having a sine wave, a light receiving circuit 5b for amplifying a reflection signal photoelectrically converted from reflected light of the measuring object by the light receiving element 5a, an AD converter 91 for converting an analog reflection signal amplified by the light receiving circuit 5b to a digital reflection signal, a signal processing unit 92 for obtaining a phase difference between measurement light and reflected light, a system controller 93 for calculating a distance to the measuring object based on the obtained phase difference, and the like.

The system controller 93 including a microcomputer and peripheral circuits thereof is configured to control the entire system, and is connected with a plurality of reflection photoelectric sensors 1, a motor control circuit 16 for driving the motor 11, and the scanning angle detecting unit 15.

When power of the system is turned ON, a motor drive signal is output from the system controller 93 to the motor control circuit 16, and the motor drive circuit 16 in turn drives the motor 11 at a predetermined speed.

A pulse signal output from the scanning angle detecting unit 15 is input to the system controller 93 with rotational drive of the motor 11, and an output direction of the measurement light is recognized by the scanning mechanism 4 as a rotary mechanism based on the pulse signal.

A slit interval of the encoder plates 15a configuring the scanning angle detecting unit 15 is formed so as to have an interval different from the others at a reference position of the rotating body set in advance, that is, at a position where the reference light is guided from the light guiding member 7 to the light receiving unit 5, where the reference position is recognized based on the waveform of the detected pulse signal, and the rotation angle from the reference position is calculated by counting the number of pulses from the reference position.

In the signal processing unit 92, the modulation signal to be output to the drive circuit 3b is generated, and the phase difference between the reflection signal converted to the digital signal in the AD converter 91 and the modulation signal is calculated and then is output to the system controller 93.

In the system controller 93, the above-described phase difference input from the signal processing unit 92 is applied to Equation 1 to calculate a distance to the measuring object, and the calculated distance is corrected based on the reference distance detected once for every cycle and then output.

Furthermore, the system controller 93 includes an optical window monitor 93a for monitoring the state of contamination on the optical window 102 based on the scanning angle detected by the scanning angle detecting unit 15 and the amount of light detected by the reflection photoelectric sensor 1.

The optical window monitor 93a obtains a timing different from the timing when the reflected light from the measuring space is detected by the light receiving unit 5, that is, a timing when the detection light from the reflection photoelectric sensor 1 does not enter the distance measurement light receiving unit 5 as stray light based on the scanning angle, light emission drives the each reflection photoelectric sensor 1 at such a timing, determines whether or not the optical window 102 is contaminated based on the amount of detection light from the each reflection photoelectric sensor 1, and stops the apparatus after performing error display on a display unit of the apparatus when contamination affecting measurement is detected.

As the detection light from the reflection photoelectric sensor does not enter the distance measurement light receiving unit as stray light, contamination on the optical window can be appropriately detected while accurate measurement of the distance being performed.

According to the above-described configuration, the optical window monitor recognizes the position of the retro-reflective member based on the scanning angle detected by the scanning angle detecting unit, and appropriately detects contamination on the optical window by determining the output state of the each reflection photoelectric sensor in correspondence to the position.

For instance, the reflection photoelectric sensor 1 is light emission driven to detect contamination in FIG. 1 showing the timing when measurement light is irradiated onto the light guiding member 7, whereas the reflection photoelectric sensor 1 is turned OFF in FIG. 2 showing the timing when measurement light is irradiated to the measuring space.

FIG. 3 shows that detection light is irradiated onto the retro-reflective member 2 by one reflection photoelectric sensor 1a out of the plurality of reflection photoelectric sensors 1 arranged on the housing 104 on the lower side of the optical window 102 when the retro-reflective member 2 moves through positions 2a, 2b, and then 2c with the rotation of the scanning mechanism 4. Contamination on the optical window 102 is detected at least at such detection timings.

Figure 5:
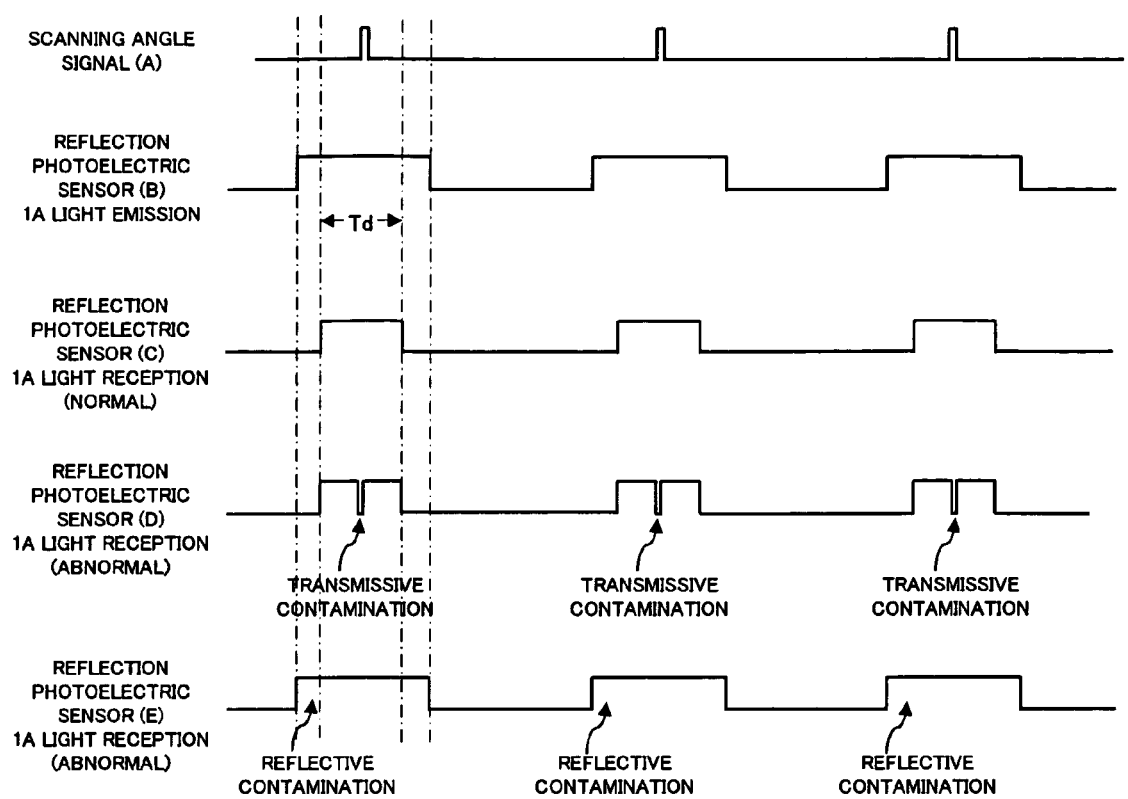
FIG. 5 is a timing chart for contamination detection.

As shown in FIG. 5, when the reflection photoelectric sensor 1a is light emission driven (signal B in the figure) to the retro-reflective member 2 at a predetermined timing based on a scanning angle signal (signal A in the figure), a predetermined reflection signal (signal C in the figure) having a pulse width Td is detected from the retro-reflective member 2 in synchronization with the light emission drive timing if contamination is not found on the optical window 102, and a timing when the reflection signal is not detected is generated within the pulse width Td if contamination inhibiting transmission of light is found on the optical window 102 (signal D in the figure).

The optical window monitor 93a determines that non-reflective contamination, that is, black contamination with light absorption property is present in such a case.

If light that is not usually detected before or after the normal reflection signal (signal C) having the pulse width Td is detected in synchronization with the light emission drive timing (signal B in the figure), the optical window monitor 93a determines that reflective contamination, that is, white contamination of high reflectivity is attached to the optical window 102.

In the figure, a timing when a pulse of the scanning angle signal (signal A in the figure) is output indicates a timing when measurement light output from the light transmitting unit 3 enters the light guiding member 7, where the each reflection photoelectric sensor 1 is sequentially light emission driven with the timing as a reference such that the reflection photoelectric sensor 1a arranged at a position facing the light guiding member 7 is driven, and then the reflection photoelectric sensor 1b along the rotating direction of the scanning mechanism 4 is driven while being delayed by a predetermined time.

In other words, an optical window contamination detecting device of the scanning type distance measuring apparatus 100 is configured by arranging a plurality of reflection photoelectric sensors 1 along the optical window 102 on the outer side of the optical window 102, and attaching to the scanning mechanism 4 the retro-reflective member 2 for reflecting detection light from the reflection photoelectric sensor 1 having passed through the optical window 102 to the reflection photoelectric sensor 1.

There has been described above a case of intermittently driving the each reflection photoelectric sensor 1a, but the reflection photoelectric sensor may be successively driven. In such a case, noise can be removed by arranging in the each light emitting element a filter for applying modulation at a frequency different from the modulation frequency for the measurement light, and removing the light signal of the relevant frequency from the light signal detected by the light receiving unit 5.

The minimum detection range for contamination and the number of the reflection photoelectric sensors 1 are determined according to the performance of the retro-reflective member 2. The size of the retro-reflective member 2 is determined by the size of the minimum detection range for contamination, and the number of the reflection photoelectric sensors 1 is determined by an angular characteristic of the retro-reflective member 2.

Since the retro-reflective member 2 has an angular characteristic of greater than or equal to ±45 degrees, reflected light can be detected even when the retro-reflective member 2 is positioned at a position where the optical axis is shifted by 45 degrees from the reflection photoelectric sensor 1, by interiorly arranging in the casing of the sensor an optical system for widening an illumination angle of detection light output from the reflection photoelectric sensor 1.

When detecting reflected light from such a retro-reflective member 2, the reflection photoelectric sensor 1 can be arranged along the optical window 102 at an interval of greater than or equal to 90 degrees pitch with the center of rotation axis as the center. Thus, microscopic contamination on the optical window 102 can be detected with a less number of sensors.

Figure 10A:
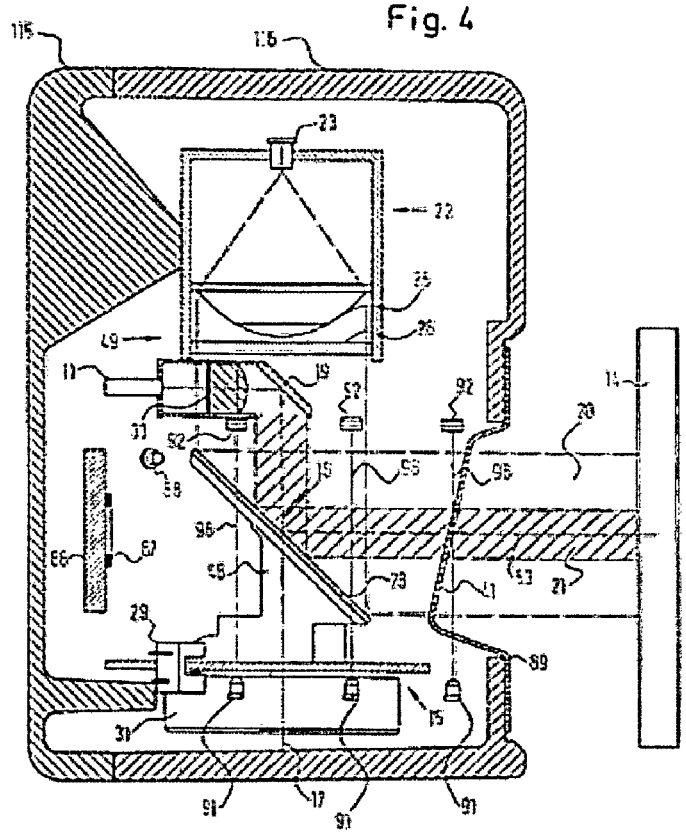
FIG. 10 is an explanatory view of a conventional optical window contamination detection.
Figure 10B:
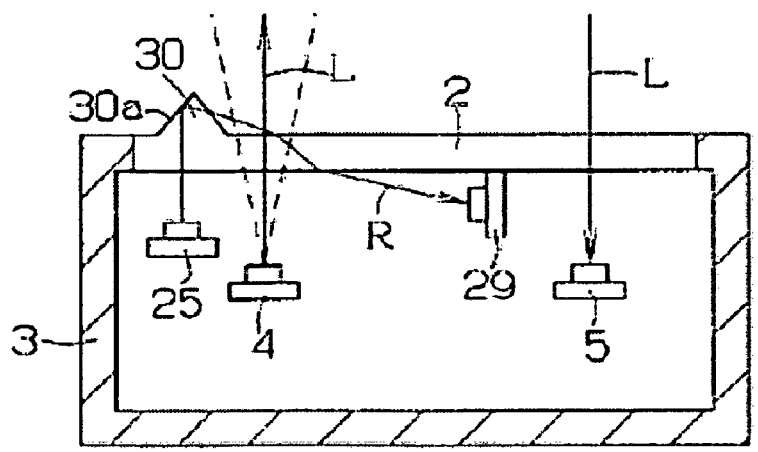

In the present embodiment, there is described a case where the first deflection mirror 9a and the second deflection mirror 9b are arranged between the light transmitting unit 3 and the light receiving unit 5, the scanning mechanism 4 for rotational scanning the measurement light is configured to pass measurement light from the upper region of the step of the optical window 102 and pass reflected light from the lower region, and a plurality of reflection photoelectric sensors 1 is arranged on the upper and lower sides of the optical window to detect the upper region and the lower region. However, the plurality of reflection photoelectric sensors 1 may be arranged only on one of the two sides if the light transmitting unit 3 for outputting measurement light and the light receiving unit 5 for detecting reflected light are arranged in parallel with each other and measurement light is deflected and reflected light is deflected with one deflection mirror as in FIG. 10A for describing the conventional art. Furthermore, the reflection photoelectric sensor 1 may be arranged only on one of the two sides by increasing the area of the retro-reflective member 2 even when the configuration of the present embodiment is adopted if beam of detection light is large.

Figure 7:
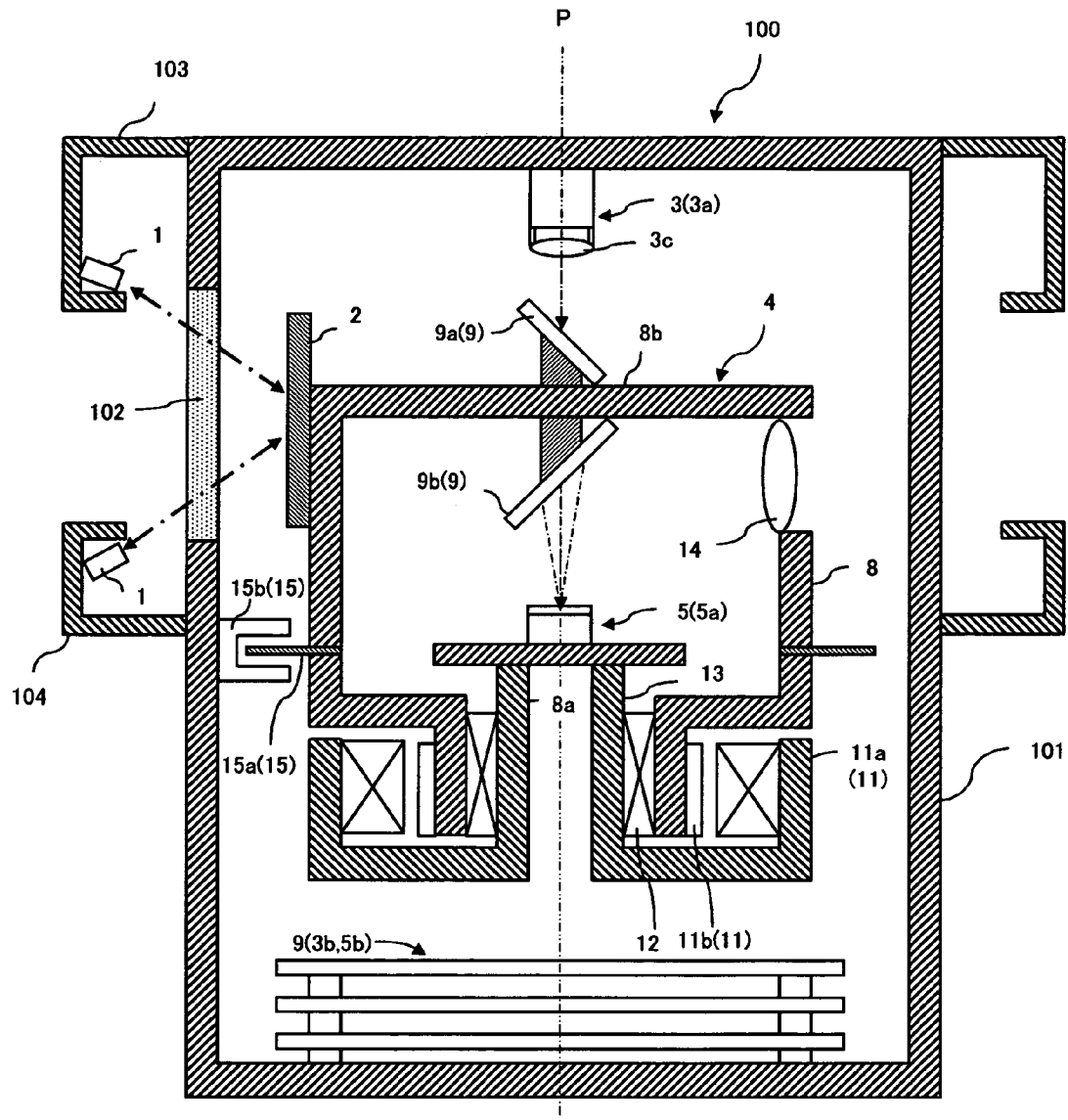
FIG. 7 is a schematic longitudinal cross sectional view showing an overall configuration of an optical window contamination detecting device for a scanning type distance measuring apparatus according to another example of the present invention.

The retro-reflective member 2 shown in FIG. 1 is attached to the peripheral wall 8a of the rotating body 8 by way of an attachment member so that the reflecting surface is close to the optical window 102, but one flat retro-reflective member 2 may be attached so as to face the optical window 102 without a step as shown in FIG. 7.

The scanning type distance measuring apparatus utilizing the AM method has been described in the above embodiment, but needless to say, application can also be made to a scanning type distance measuring apparatus utilizing the TOF method.

A case where the optical window contamination detecting device is mounted onto the scanning type distance measuring apparatus has been described in the above embodiment, but application of the optical window contamination detecting device is not limited thereto, and application can also be made to an imaging apparatus in which an imaging element such as a linear sensor and an optical element for focusing incident light on the imaging element are accommodated in a casing formed with an optical window.

In such a case, the reflection photoelectric sensor is arranged along the optical window on the outer side of the optical window, and the retro-reflective member for reflecting detection light from the reflection photoelectric sensor having passed through the optical window towards the reflection photoelectric sensor is attached outside the light path of the optical element on the inner side of the optical window.

The embodiment described above is one example of the present invention, and it should be understood that an attachment position, an attachment mechanism, and the number of the reflection photoelectric sensor, a size and an attachment position of the retro-reflective member, as well as a specific configuration of the optical window monitor can be appropriately modified and designed within a scope of exhibiting the effects of the present invention.

What is claimed is:

1. An optical window contamination detecting device for a scanning type distance measuring apparatus including a casing formed with an optical window, the casing accommodating therein a light transmitting unit, a scanning mechanism for deflection scanning measurement light output from the light transmitting unit into a measuring space through the optical window, and a light receiving unit for detecting reflected light from an object through the optical window; the optical window contamination detecting device comprising:
    a plurality of reflection photoelectric sensors arranged along the optical window on an outer side of the optical window; and
    a retro-reflective member attached to the scanning mechanism, the retro-reflective member for reflecting detection light from the reflection photoelectric sensor having passed through the optical window towards the reflection photoelectric sensor.

2. The optical window contamination detecting device for the scanning type distance measuring apparatus according to claim 1, the device further comprising:
    a scanning angle detecting unit for detecting a scanning angle of the scanning mechanism; and
    an optical window monitor for monitoring a state of contamination on the optical window based on the scanning angle detected by the scanning angle detecting unit and an amount of light detected by the reflection photoelectric sensor.

3. The optical window contamination detecting device for the scanning type distance measuring apparatus according to claim 2, wherein
    the optical window monitor determines presence of non-reflective contamination when reflected light from the retro-reflective member is not detected by the reflection photoelectric sensor, and determines presence of reflective contamination when reflected light from other than the retro-reflective member is detected by the reflection photoelectric sensor.

4. The optical window contamination detecting device for the scanning type distance measuring apparatus according to claim 1, wherein
    the retro-reflective member is arranged outside light paths of measurement light and reflected light.

5. The optical window contamination detecting device for the scanning type distance measuring apparatus according to claim 1, wherein
    the reflection photoelectric sensor is light emission driven at a timing different from a timing when reflected light is detected by the light receiving unit.

6. An optical window contamination detecting device for an imaging apparatus including a casing formed with an optical window, the casing accommodating therein an imaging element, and an optical element for focusing incident light onto the imaging element, the optical window contamination detecting device comprising:
    a reflection photoelectric sensor arranged along the optical window on an outer side of the optical window; and
    a retro-reflective member attached outside a light path of the optical element on an inner side of the optical window, the retro-reflective member for reflecting detection light from the reflection photoelectric sensor having passed through the optical window towards the reflection photoelectric sensor.

* * * * *